Jan. 5, 1971 L. TOURMEN 3,552,204
MEANS FOR DETECTING AND RECORDING WATER WAVE DIRECTION
Filed April 8, 1968 2 Sheets-Sheet 2

INVENTOR
LOUIS TOURMEN
BY
John F. Hart
ATTORNEY

United States Patent Office 3,552,204
Patented Jan. 5, 1971

3,552,204
MEANS FOR DETECTING AND RECORDING WATER WAVE DIRECTION
Louis Tourmen, Grenoble, France, assignor to Société Grenobloise d'Etudes et d'Applications Hydrauliques (SOGREAH), Grenoble, France, a corporation of France
Filed Apr. 8, 1968, Ser. No. 719,379
Claims priority, application France, Apr. 13, 1967, 5,092
Int. Cl. G01p 5/04
U.S. Cl. 73—170          10 Claims

ABSTRACT OF THE DISCLOSURE

The apparatus includes an immersed obstacle having a vertical symmetrical rotational axis, and mounted on a rod having a slight bend under water pressure on the obstacle. The direction of bend of the rod by such water pressure which is caused by the movement of the waves, is measured by suitable recording means.

---

This invention relates to apparatus for detecting and recording the direction of waves in a body of water.

Reliable knowledge of the heights of waves, their directions of movement and their periods is an essential requirement for many coastal engineering studies. Various instruments are now available to satisfactorily measure wave heights and periods, but there does not seem to be available any simple equipment for accurately and reliably measuring wave direction. Radar has provided useful data in certain cases, but such equipment is very expensive, is tricky to use, and requires a special site for the antenna.

The primary purpose of the present invention is to provide wave direction recording apparatus which is simply constructed, can be readily installed at the measurement sites, and is accurate and reliable in its operations.

It is known that the water particles in a body of water on which waves are formed, move in orbital paths that are in vertical planes defined by the direction of movement of the waves, and that are not completely closed due to the fact that the particles also have a resultant movement in these vertical planes, but very much slower than the speed of the waves. In accordance with the invention, the linear movement of these orbital paths of the water particles are detected by the direction of the wake that is produced by the water particles on a permanently submerged obstacle mounted on a bendable rod. The direction and magnitude of the wake is established by measuring the amount of bend of the rod carrying the obstacle. The submerged obstacle has a configuration which is symmetrical about a vertical rotational axis and which may be for example, a sphere, or an upright cylinder, or an ellipsoid. The rod has a vertical longitudinal axis which coincides with the revolution axis of the obstacle.

Figure 1:
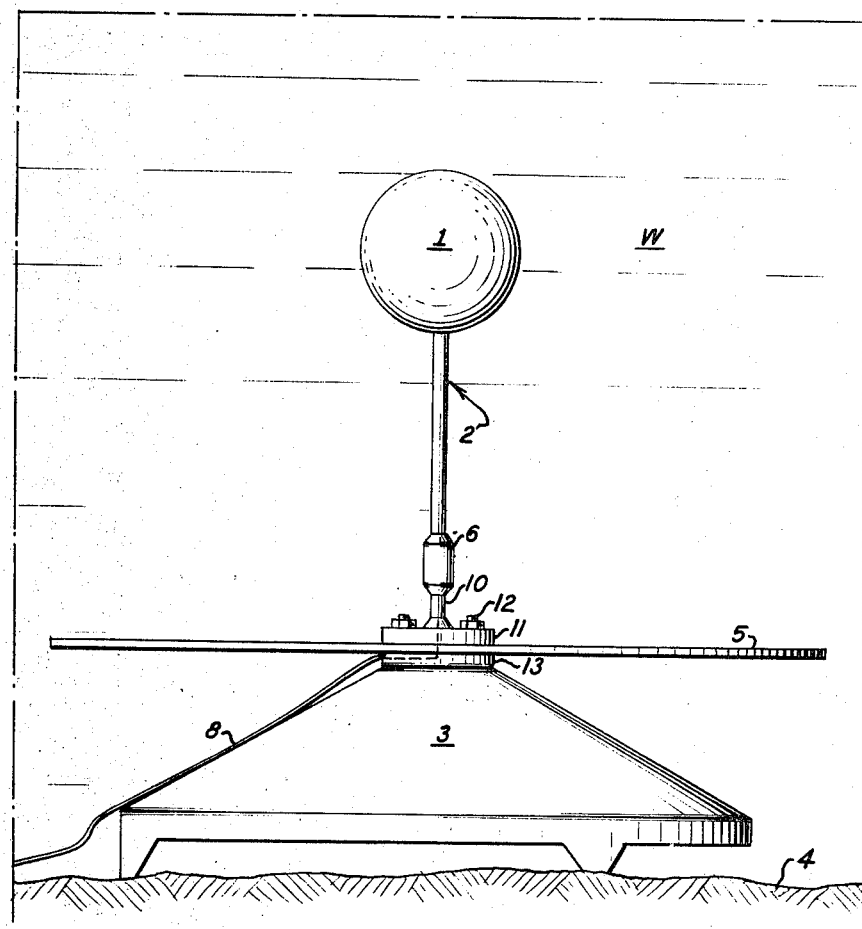
Figure 2:
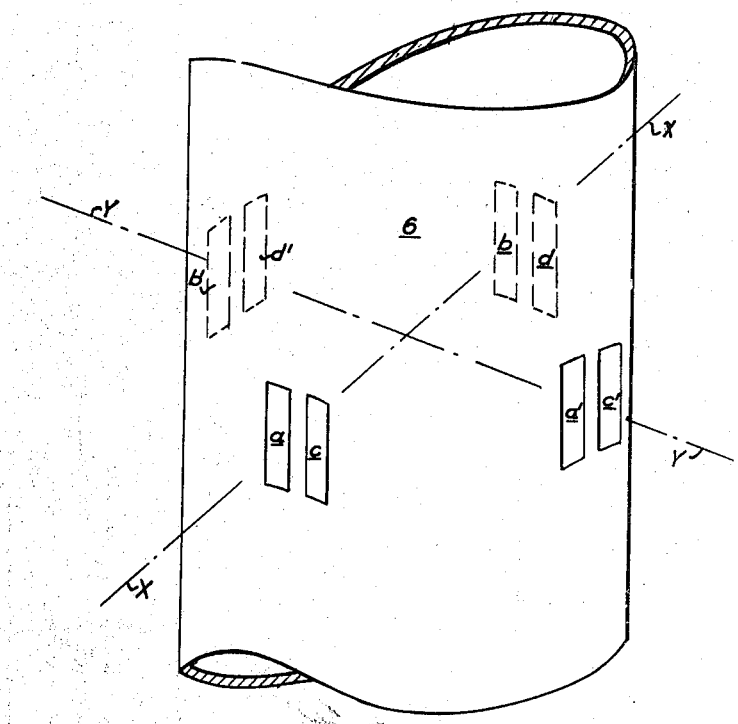
Figure 3:
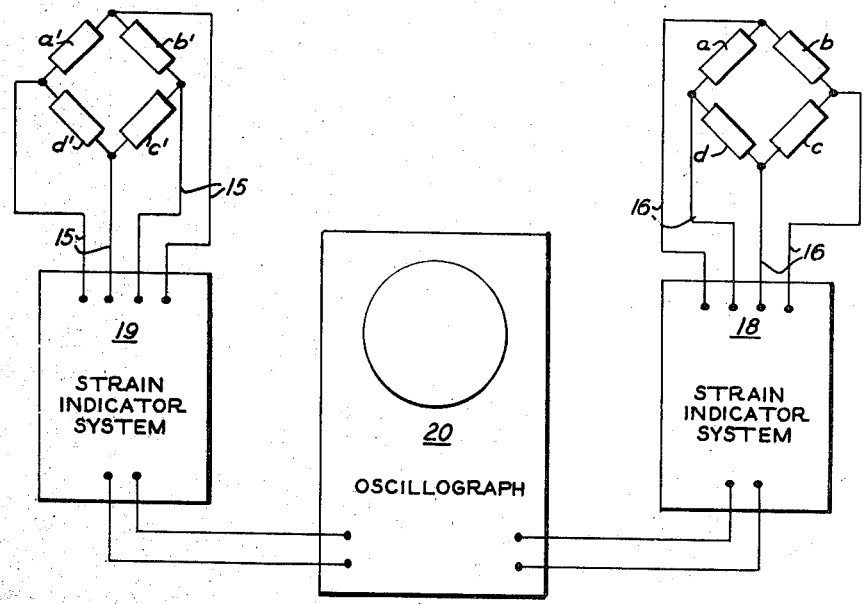

For a better understanding of the invention, reference is made to the following detailed description which should be read in connection with the accompanying drawings, in which FIG. 1 is a side elevational view of a wave detection device embodying the invention;

FIG. 2 is an enlarged perspective view of a portion of the cylindrical cell shown in FIG. 1 and showing the strain gauge positions on said cylindrical portion; and FIG. 3 is a circuit diagram for the device.

Referring now more particularly to FIGS. 1 and 2 of the drawings, the reference numeral 1 designates the submerged obstacle that is effected by the movements of the water particles resulting from the waves produced on the body of water W. In the embodiment shown, the obstacle 1 is in the form of a sphere that is attached to the upper end of a rod 2 and which may have a diameter of from 5 to 30 centimeters. The sphere supporting rod is composed of a rod member of a height of from 20 to 50 centimeters and a cylindrically-shaped member or cell 6 having a height of about 10 centimeters and a diameter of about 5 centimeters. The rod member is such that it has practically very little flexibility and an extremely small bending under the action of the waves, such bending being just sufficient to permit measurement by strain gauges provided on the cell 6 as will be hereinafter more fully explained. Thus, the rod 2, as a whole, may be considered as one which has a slight flexion only at the level of the strain gauges on the member or cell 6 where it is thinner or less rigid. The lower end of the rod member is suitably secured in liquid-tight relation to the upper end of the cylindrically-shaped member 6, which is secured at its lower end in liquid-tight relation to the upper end of a tubular shank 10 integral with the top wall of a coupling ring 11. Bolts 12 secure the coupling ring 11 to a mounting ring 13 formed at the top of a heavy base mounting 3 standing on the sea bed 4. Secured between the rings 11 and 13 is a circular plate 5 that is of sufficient diameter to enable it to function as a shield to prevent sea bed activities interfering with the motions of the sphere 1.

The obstacle or sphere 1 is immersed to a depth at which the horizontal velocities of the water particles are at a maximum and unobstructed by disturbances on the surface. Under normal conditions it has been found that these objects will be attained by submerging the sphere 1 to a depth of about 10 to 15 meters below the mean sea level. At such depth, the orbital paths of the water particles, that is to say the wave direction, can be best detected. As has been above indicated, such detection is accomplished by the drag on the sphere 1 causing a bend in the flexible rod 2 comparable to the degree of such drag and its direction.

According to a preferred form of the invention, the amount of bending of the rod 2 due to the motion of sphere 1 under wave action is measured by two strain gauge bridges attached to the periphery of the rod in line with generatrices and in planes at 90 degrees to each other. These bridges are preferably contained in the member 6 which may be termed a "cell." As is shown in FIG. 2 of the drawings one of the strain gauge bridges consists of strain gauges $a$, $b$, $c$ and $d$ of known construction and positioned on two diametrically opposite generatrices, as illustrated. The direction of this bridge is indicated by the line designated X—X. The other bridge consists of strain gauges $a'$, $b'$, $c'$ and $d'$ arranged in a manner similar to gauges $a$, $b$, $c$ and $d$, but located on the cell 6 so that the direction Y—Y of such other bridge is in a vertical plane disposed at 90 degrees to a vertical plane containing the axis XX. It will be understood that with the two strain gauge bridges arranged in this fashion, the strains in the material of the wall of cell 6 produced by the bend in the rod 2 of which it forms a part, will be measured by the said bridges in two directions at 90 degrees to each other. Such measurements will give the direction in which the rod is being bent and hence also, the direction of wave drag on the obstacle attached to the upper end of the rod. It will be understood that the size of the obstacle is relatively large and such as to enable the horizontal velocities of the particles to exert sufficient force thereon even when such velocities are caused by small waves to enable a measurement to be taken thereof by the strain gauge bridges.

The leads 15, 16 in FIG. 3 of the two strain gauge bridges extend in the form of a cable 8 in FIG. 1 from the cell 6 to filtering, amplifying and recording equipment installed on the shore. This equipment comprises a conventional bridge-type strain indicator which feeds signals to a joint oscillograph of known construction that directly records the resultant of the signals from the two strain gauge bridges. As will be seen from FIG. 3 of the drawings, the bridges $a$, $b$, $c$, $d$ and $a'$, $b'$, $c'$, $d'$ are each connected to its own strain indicator system, 18 and 19, respectively, which filter and amplify the incoming strain gauge signals from the cell 6. The indicator systems 18 and 19 are designed to be sensitive only to rapid changes in input signals, in order not to take into account permanent sea current loads. Since the magnitude of the force acting on the device is of little importance, the amplifier response curve of these systems need not be linear, and the apparatus can therefore be made more sensitive for small waves, and less sensitive for large waves. The filtered and amplified strain gauge signals are fed by the systems 18 and 19 to an oscillograph 20 which records the resultant of the two signals. This resultant corresponds to the orthogonal bending components detected by the bridges $a$, $b$, $c$, $d$ and $a'$, $b'$, $c'$, $d'$, that is to say the wave direction. The recording part of the oscillograph 20 should be calibrated with reference to the compass direction in which the longitudinal axis of the rod 2 points in order that there may be directly produced a wave direction diagram which is characteristic of the particular geographical region being measured.

While there has been hereinabove described and illustrated in the drawings, a preferred embodiment of the invention, it will be understood by those skilled in the art that various modifications thereof may be made without departing from the spirit of the invention or the scope of the appended claims.

I claim:

1. Apparatus for detecting the direction of waves in a body of water, said apparatus being sensitive to the rapid, repetitive horizontal force components of rapidly following horizontally movable orbital paths of movement of water particles in such body of water produced by successive waves, and not taking into account slow variations in any permanent currents in such body of water, said apparatus comprising an obstacle body immersible in the body of water to a depth at which the horizontal velocities of the water particles are unobstructed by surface disturbances, anchoring means located below said obstacle body, an elongated relatively slender vertical member connecting said obstacle body to said anchoring means and capable of being rapidly and repetitively bent in the direction of linear movement that the successive orbitally moving particles are given by the successive waves under the rapid, repetitive horizontal forces exerted by such water particles on the obstacle body, and means for detecting the direction of bend of said flexible member, including means responsive to such rapid repetitive bending of said member for creating signals comparable thereto, and means sensitive only to such rapidly changing signals.

2. Apparatus for detecting the direction of waves in a body of water, said apparatus being sensitive to the rapid, repetitive horizontal force components of rapidly following horizontally movable orbital paths of movement of water particles in such body of water produced by successive waves, and not taking into account slow variations in any permanent currents in such body of water, said apparatus comprising an obstacle body immersible in the body of water to a depth at which the horizontal velocities of the water particles are unobstructed by surface disturbances, anchoring means located below said obstacle body, an elongated relatively slender vertical member connecting said obstacle body to said anchoring means and capable of being rapidly and repetitively bent in the direction of linear movement that the successive orbitally moving particles are given by the successive waves under the rapid, repetitive horizontal forces exerted by such water particles on the obstacle body, a shield connected to said elongated member and located between said anchoring means and said obstacle body, said shield being of such area as to prevent activity in said body of water below the same interfering with the action of the orbitally moving water particles on said obstacle body, and means for detecting the direction of bend of said flexible member, including means responsive to such rapid repetitive bending of said member for creating signals comparable thereto, and means sensitive only to such rapidly changing signals.

3. Apparatus as defined in claim 2, in which said obstacle body has a configuration that is symmetrical about a vertical rotational axis.

4. Appratus as defined in claim 3, in which said elongated member has a substantially vertical longitudinal axis which coincides with the revolution axis of said obstacle body.

5. Apparatus as defined in claim 2, in which said elongated member is relatively rigid throughout the major portion of its length and has a slight flexion in the region thereof wherein said detecting means detects the bend thereof.

6. Apparatus as defined in claim 2, in which said elongated member is substantially vertically mounted on said anchoring means and carries said obstacle on the upper end portion thereof.

7. Apparatus as defined in claim 2, in which said anchoring means comprises a heavy base, and in which said elongated member comprises a vertical rod carrying said obstacle body, and including means for securing the lower end of said rod to said base.

8. Apparatus as defined in claim 2, in which said elongated member comprises a portion less rigid than the remainder of said member between such portion and said obstacle body, and in which said detecting means comprises means connected to said portion of said elongated member and capable of detecting bending stresses in the latter and of sending signals which are indicative of the direction of bend causing such stresses, and indicating means connected to said signalling means and controlled by the signals transmitted by the latter.

9. Apparatus as defined in claim 8, in which said portion of said elongated member comprises a cylindrically shaped part, and in which said signalling means is mounted on said part and is composed of two strain gauge bridges attached to the periphery of such part in line with generatrices and in planes at 90 degrees to each other.

10. Apparatus as defined in claim 2, in which said sensitive means forming part of said indicating means is composed of two indicators constructed and arranged to be more sensitive to waves of given size and insensitive to permanent sea current loads, and said detecting means including a joint oscillograph for directly recording the resultant of the signals from two indicators.

References Cited
UNITED STATES PATENTS

| | | | |
|---|---|---|---|
| 1,968,382 | 7/1934 | Fales | 73—147 |
| 2,375,227 | 5/1945 | Hillman | 73—189 |
| 3,217,536 | 11/1965 | Motsinger et al. | 73—189 |

OTHER REFERENCES

Perry, C. C. et al.: The Strain Gage Primer, 2nd ed., 1962, pp. 235–238.

JERRY W. MYRACLE, Primary Examiner

U.S. Cl. X.R.

73—189